(12) United States Patent
Massis et al.

(10) Patent No.: US 12,337,564 B2
(45) Date of Patent: Jun. 24, 2025

(54) MOLD SEGMENT WITH CONNECTED FIRST AND SECOND SIPE ELEMENTS FOR USE IN FORMING A TIRE

(71) Applicant: Compagnie Generale des Etablissements Michelin, Clermont-Ferrand (FR)

(72) Inventors: Frederic Massis, Clermont-Ferrand (FR); Damien Bardin, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 457 days.

(21) Appl. No.: 17/780,261

(22) PCT Filed: Dec. 12, 2019

(86) PCT No.: PCT/IB2019/060733
§ 371 (c)(1),
(2) Date: May 26, 2022

(87) PCT Pub. No.: WO2021/116738
PCT Pub. Date: Jun. 17, 2021

(65) Prior Publication Data
US 2022/0410515 A1    Dec. 29, 2022

(51) Int. Cl.
*B29D 30/06*    (2006.01)
(52) U.S. Cl.
CPC .. *B29D 30/0606* (2013.01); *B29D 2030/0613* (2013.01)

(58) Field of Classification Search
CPC .............................................. B29D 2030/0613
See application file for complete search history.

(56) References Cited

U.S. PATENT DOCUMENTS

| | | | |
|---|---|---|---|
| 2018/0147748 A1 | 5/2018 | Jenkins et al. | |
| 2018/0162016 A1* | 6/2018 | Reeb | B29C 33/10 |
| 2019/0389164 A1* | 12/2019 | Massis | B29D 30/0606 |

FOREIGN PATENT DOCUMENTS

| | | | |
|---|---|---|---|
| CN | 110382217 A | 10/2019 | |
| EP | 1034908 A1 * | 9/2000 | B29C 33/301 |

(Continued)

OTHER PUBLICATIONS

Kaczorwski, J. EP1034908B1. 2003. ESpaceNet Machine Translation. (Year: 2024).*

(Continued)

*Primary Examiner* — John J DeRusso
*Assistant Examiner* — Alexander D Booth
(74) *Attorney, Agent, or Firm* — Neal P. Pierotti (57) ABSTRACT

A mold segment for forming a tire is provided that has a first sipe element with a protrusion that extends from a first sipe element side surface. The height of the protrusion is less than a height of the first sipe element side surface. A second sipe element is present and has a cavity that extends from a second sipe element side surface. The cavity has a height that is less than a height of the second sipe element side surface. A mold segment base is included that receives the first sipe element and the second sipe element. The cavity receives the protrusion such that the protrusion is located in the cavity and so that the first sipe element side surface directly faces the second sipe element side surface.

15 Claims, 11 Drawing Sheets

(56) References Cited

FOREIGN PATENT DOCUMENTS

| | | | | |
|---|---|---|---|---|
| FR | 3063242 A1 | * | 8/2018 | ......... B29D 30/0606 |
| KR | 101680881 B1 | * | 11/2016 | |
| WO | 2019224479 A1 | | 11/2019 | |

OTHER PUBLICATIONS

Yongbeom N. KR10168088B1. 2016. ESpaceNet Machine Translation. (Year: 2024).*
European Patent Office, International Search Report dated Aug. 28, 2020, pp. 1-9 (included), European Patent Office, Rijswijk, The Netherlands.

* cited by examiner

MOLD SEGMENT WITH CONNECTED FIRST AND SECOND SIPE ELEMENTS FOR USE IN FORMING A TIRE

CROSS-REFERENCE TO RELATED APPLICATIONS

The present application is a 35 U.S.C. § 371 application of PCT/IB2019/060733 filed on Dec. 12, 2019 and entitled "Mold Segment with Connected First and Second Sipe Elements for Use in Forming a Tire." PCT/IB2019/060733 is incorporated by reference herein in its entirety for all purposes.

FIELD OF THE INVENTION

The present invention relates generally to a mold segment for the formation of tires. More particularly, the present application involves a mold segment that features first and second sipe elements that can be received onto one another via a protrusion and cavity arrangement to form a sipe in the tire tread.

BACKGROUND

The production of tires includes the step of placing an uncured tire within a mold at which time heat and pressure is applied to the uncured tire in order to change its state to a cured condition. During the curing process, the uncured tire is placed inside of a metal mold that surrounds the exterior of the uncured tire. An expandable rubber bladder is positioned inside of the uncured tire, when it is within the mold, and is expanded to apply pressure to the inside surface of the uncured tire. The pressure applied by the expandable bladder forces the uncured tire against the mold to cause the uncured tire to be under pressure forces. Heat is simultaneously applied, and the combination of heat and pressure applied for a particular time effects the curing process. The cured tire is then be removed from the mold and transported downstream for subsequent processing.

The expandable bladder when inflated and applying force causes the crown portion of the tire to be forced against a garniture of the mold that includes a series of features that form grooves, sipes, and tread blocks of the tire to result in the formation of the tread design of the tire. The garniture can be made of two or more multiple sections that are arranged in a circle, and these production mold segments are used to form the architecture of the tread. In order to form a teardrop longitudinal sipe of the tread, a series of sipe sections are present in the production mold segment. Additional sipe elements may be included to form sipes that could be V-shaped, Y-shaped, or alternatively shaped and that can extend in the longitudinal direction, lateral direction, or both in the longitudinal and lateral directions.

In order to form the production mold segment, the casting process employs a gypsum/plaster cast segment that includes the sipe elements. In order to form the gypsum cast segment, a flexible cast segment is used and into this flexible cast segment the sipe elements, which can be made of steel, are inserted. The sipe elements may be V-shaped, Y-shaped or alternatively shaped in order to form a sipe of the desired shape. However, the shapes of some of these sipe elements hinders optimal filling of them into the flexible cast segment. This is because the size and shape of the sipe elements may make it difficult for them to be fit into the allotted space of the mold segment. Also, the complex shapes of the sipe elements prevents their formation with the use of an additive manufacturing process which can increase the cost of the sipe elements and reduce flexibility when constructing the mold. In particular, V-shaped and Y-shaped sipe elements cannot be made via an additive manufacturing process. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

A mold segment 10 is provided that has a first sipe element 12 and a second sipe element 24 that feature a protrusion 18 and a cavity 30. The protrusion 18 of the first sipe element 12 can be inserted into the cavity 30 of the second sipe element 24 to cause the sipe elements 12, 24 to be connected to one another when placed into the mold segment 10. This arrangement allows for greater flexibility when loading the mold segment 10 with the sipe elements 12, 24 as the sipe elements 12, 24 need not be connected together during loading. Greater flexibility in producing the sipe elements 12, 24 can also be realized if they are desired to be a complex shape. For example, if the sipe 44 is to be V-shaped, then instead of having to create a V-shaped structure, each of the sipe elements 12, 24 could be constructed to be relatively flat/straight and then subsequently assembled with one another to form the desired V-shaped arrangement. An additive manufacturing process may be utilized to form the sipe elements 12, 24 as they are formed separately as flatter segments that are only afterwards assembled into a more complex shape. In a similar manner, sipes 44 desired to be Y-shaped or other complex shapes may also be capable of being more easily inserted into the segment mold 10 and made via an additive manufacturing process if constructed of separate sipe elements 12, 24 that are subsequently assembled via insertion of the protrusion 18 into the cavity 30. As such, the sipe elements 12, 24 are straighter individually when disassembled, and when assembled the resulting structure is more angled and/or complex.

Figure 1:
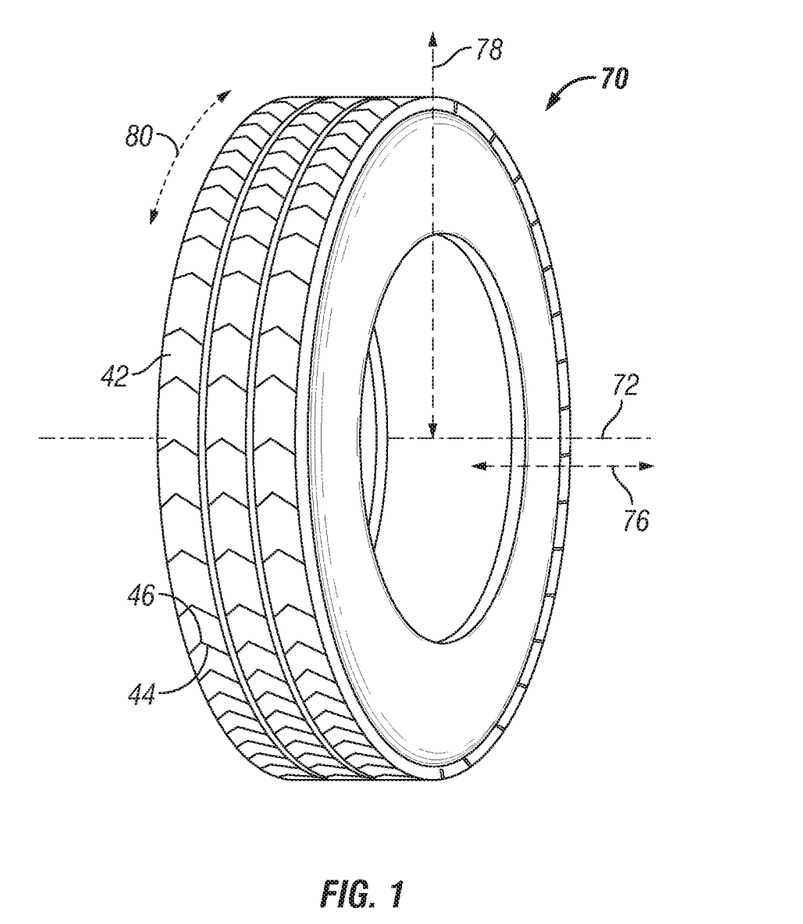
FIG. 1 is a perspective view of a tire with V-shaped sipes.

With reference to FIG. 1, a tire 70 is illustrated in perspective view that has a central axis 72 that serves as the axis of rotation of the tire 70. The central axis 72 extends through the center of the tire 70 and is aligned in the axial direction 76. The radial direction 78 of the tire 70 extends outward from the central axis 72 and is perpendicular to the central axis 72. The tire 70 also has a circumferential direction 80 that extends around the circumference of the tire 70 and circles the central axis 72. The circumferential direction 80 may be located at any distance from the central axis 72 in the radial direction 78 of the tire 70, and need not be located only at the tread 42 or the outer most portion of the tire 70 in the radial direction 78. The tire 70 has tread 42 that features various tire architecture such as tread blocks, grooves, sipes, and ribs. The tread 42 shown has two teardrop longitudinal sipes that extend around the entire circumference of the tread 42. In this regard, the teardrop longitudinal sipes 44 extend 360 degrees around the central axis 72.

Other tire 70 architecture of the tread 42 shown includes V-shaped sipes 44 that are located in the three sections formed by the shoulder edges of the tread 42 and the two teardrop longitudinal sipes. A sipe 44 is defined as a groove of the tread 42 that has a width at the tread surface that is 2 millimeters or less. The grooves of the tread 42 may thus be grooves that have widths that are greater than 2 millimeters. The widths of the sipes 44 can be measured at the surface of the tread 42 when the tread 42 is new and not worn, as in some instances the teardrop sections of the sipes 44, if they have them, may in fact be larger than 2 millimeters. Although no grooves are shown, it is to be understood that in other arrangements they may be present. The sipes 44 and grooves can take on any shape and extend in any direction such as angled, curved, or zig-zag. The sipes 44 are V-shaped in that they have two legs arranged at an angle to one another, and an apex 46 is at the point where the two legs intersect. A pair of sidewalls extend from the crown of the tire 70 on either side in the axial direction 76 towards the center in the radial direction 78. Depending upon the tire 70 geometry, some features of the tread 42, such as lateral sipes 44 and grooves, may extend into the sidewalls as well.

Figure 2:
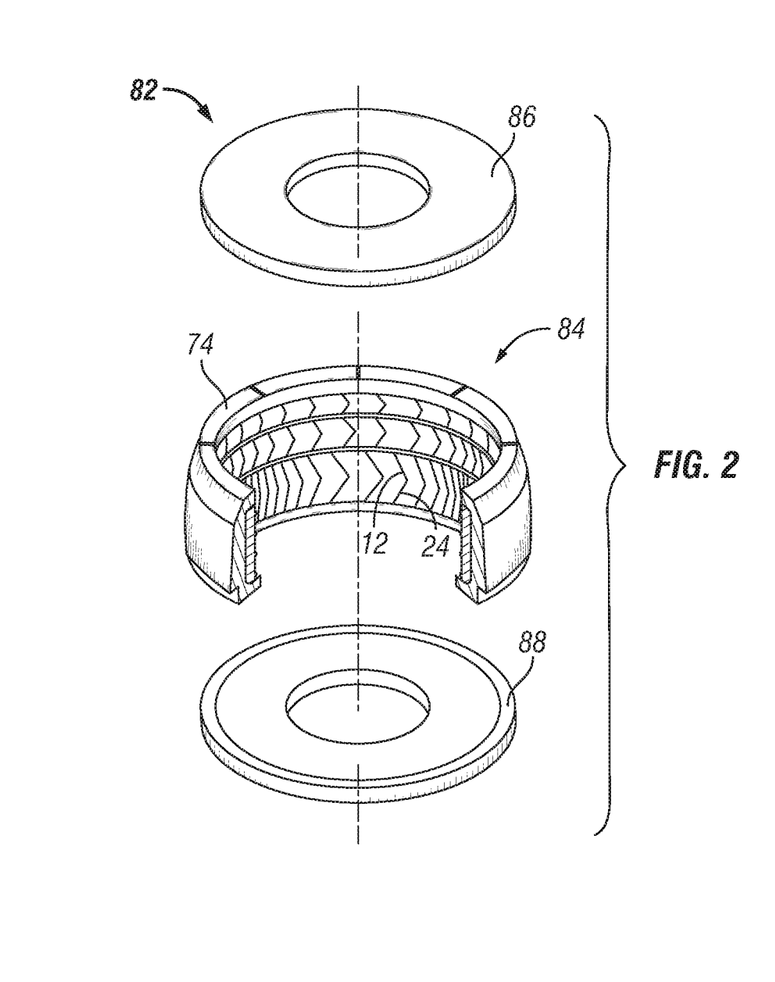
FIG. 2 is an exploded perspective view of a mold.

FIG. 2 shows a mold 82 for curing a tire 70. A tire 70 that is made of uncured rubber is placed into the mold 82 and cured via heat and pressure applied by the mold 82. The mold 82 can be configured in a variety of ways. In the embodiment illustrated, the mold 82 includes a garniture 84 that has a series of production mold segments 74 that engage the tire 70 to form the tread 42 of the tire 70. The mold 82 also includes a top mold section 86 and a bottom mold section 88 that engage the sidewalls of the tire 70 and form the sidewall portions. In other arrangements, additional top and bottom mold sections 86, 88 can be included and thus multiple other components may be present in the mold 82 for forming the tire 70. The green/unmolded tire 70 can be placed inside of the garniture 84 and the top and bottom mold sections 86, 88 may be moved into engagement with the garniture 84. An inflatable bladder is placed through one of the sections 86, 88 and inside of the tire 70 and is inflated in order to press the tire 70 against the tread producing elements 12, 24 of the production mold segments 74 and against the insides of the top and bottom mold sections 86, 88. Heating elements can be located within the various production mold segments 74 or they may be otherwise heated in order to transfer heat into the tire 70 that is within in the mold 82. In this manner, the mold 82 is capable of applying heat and pressure to the tire 70 that is within the mold 82. Although described as all being moveable, it may be the case that some of the production mold segments 74 are not movable while others are in fact movable to open and close the mold 82. The production mold segments 74 may be movable in that they move relative to the ground onto which the mold 82 rests.

The bladder can be inflated with air, steam, liquid, nitrogen, or any other fluid to cause it to expand to force the tire 70 against the tread 42 and sidewall forming portions of the mold 82. After sufficient heat and pressure are applied to the tire 70 for a sufficient amount of time, the bladder can be deflated and the top and/or bottom mold sections 86, 88 can be moved away from the garniture 84 to allow the cured tire 70 to be removed for subsequent processing.

Figure 3:
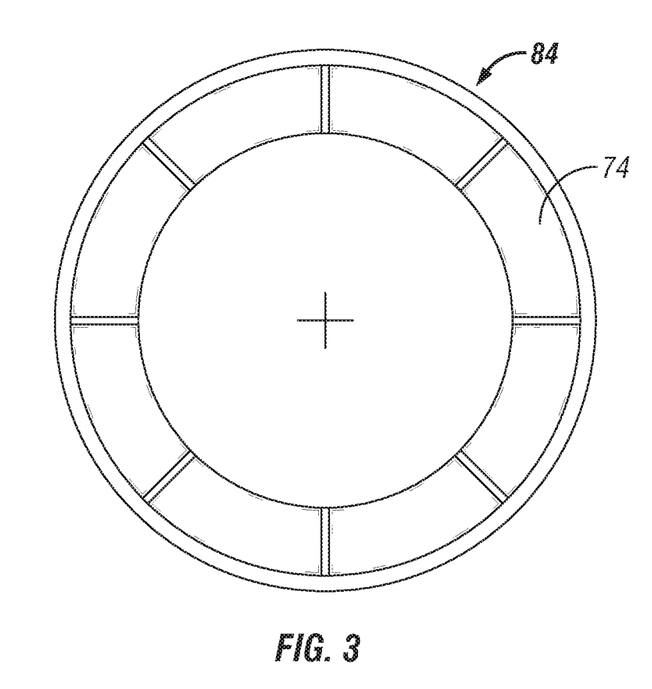
FIG. 3 is a top view of a garniture.

With reference to FIG. 3, the garniture 84 of the mold 82 is made of a plurality of production mold segments 74 that extend 360 degrees about an axis. The production mold segments 74 may be in engagement with one another, or a small space could be present between the production mold segments 74. In some arrangements, the production mold segments 74 can move in the radial direction towards the central axis to further add pressure to the tire 70 during curing. In other instances, the production mold segments 74 are stationary and do not move in the radial direction. The production mold segments 74 can be the same size as one another, or may be different sizes from one another. Although 8 production mold segments 74 are shown, it is to be understood that the garniture 84 can include any number of production mold segments 74 in other arrangements. For example, from 9-12 production mold segments 74 can be included in the garniture 84 in other versions of the mold 82. The production mold segments 74 thus engage the tire 70 during formation, and include the various sipe elements such as the first sipe element 12 and the second sipe element 24 that are used to form sipes 44 of the tire 70 upon molding by the mold 82.

In order to make the production mold segment 74, the mold making process can employ a gypsum cast segment that includes embedded in it sipe making elements such as the first and second sipe elements 12, 24. The first and second sipe elements 12, 24 are embedded into the gypsum cast segment so that the teardrop sections, if present, of the first and second sipe elements 12, 24 are more into the gypsum and the narrow sections extend more out of and away from the gypsum. The gypsum cast segment also has various features that are imparted into the production mold segment 74 such as grooves, ribs, and shoulder features. The gypsum cast segment is a positive image of the tread 42. Hot aluminum is poured onto the gypsum cast segment which then hardens and takes on the features of the gypsum cast segment and the exposed pieces such as the sipe elements 12, 24 are embedded into the production mold segment 74. The narrow sections of the sipe elements 12, 24 may be those that are embedded into the production mold segment 74. The gypsum may be machined off as desired in order to complete the production mold segment 74.

Figure 4:
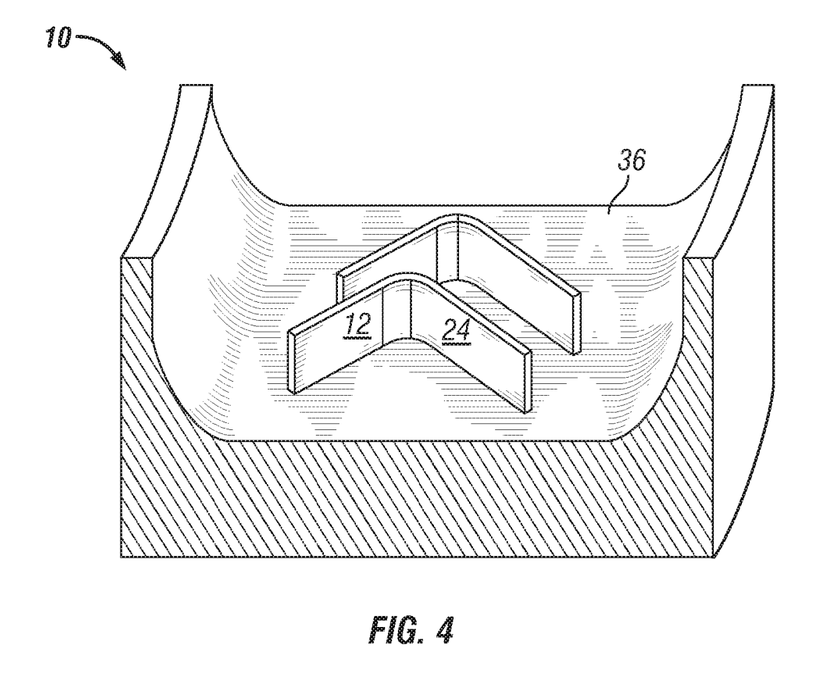
FIG. 4 is a perspective view of a mold segment.

In order to create the gypsum cast segment, the molding process may use a mold segment 10, one example of which is illustrated with reference to FIG. 4. The mold segment 10 has some flexibility in it and may sometimes be referred to as a flexible cast segment 10. The mold segment 10 may be made out of castable mold rubber such as polysulfide rubber. Silastene may be one material that makes up the mold segment 10. The mold segment 10 has a mold segment base 36 and it is this base 36 that can be made of polysulfide rubber and be somewhat flexible. The various features in the mold segment base 36 that form the architecture of the tread 42 can be made out of the flexible material. Additionally, the first and second sipe elements 12, 24 can be placed into the mold segment base 36 at this stage of the production process, and these first and second sipe elements 12, 24 may be eventually transferred to the production mold segment 74 and engage the tire 70 to form the sipes 44. The first and second sipe elements 12, 24 are pushed into the flexible mold segment base 36 and held therein by the gripping force of the flexible mold segment base 36. The first and second sipe elements 12, 24 are interlocked with one another via a connection described herein so that their position relative to one another remains constant, and so that flexibility in construction and placement is attained. The two sipe elements 12, 24 are assembled in a V shape so that they form a V shaped sipe 44. Only two sets of sipe elements 12, 24 are shown for sake of simplicity in the drawing. However, if a complex pattern of sipe elements 12, 24 is present in the mold segment base 36 necessitating many sipe elements 12, 24 in a complex pattern, construction of the sipe elements 12, 24 as separate components allows one to fit them in easier than would be the case if the sipe elements 12, 24 were integrally formed with one another. In this regard, the separate elements 12, 24 could be positioned over or against other elements in an easier manner as smaller elements may be easier to work with in assembly. The mold segment 10 may be used to create a gypsum plaster cast that can be used to create a production mold segment 74, and the sipe elements 12, 24 may be located in any of these various mold segments.

Although two sets of complimentary sipe elements 12, 24 are disclosed, any number of sets of sipe elements 12, 24 can be present in the mold segment base 36. The sipe elements 12, 24 inserted into the mold segment base 36 may engage it only at the bottom, or various feature forming portions of the mold segment base 36 can touch the sipe elements 12, 24 on their sides as well. The sipe elements 12, 24 are arranged into the mold segment base 36 so that narrow sections extend out of the mold segment base 36 and the teardrop sections of the sipe elements 12, 24 are farther away from this point of extension.

Figure 5:
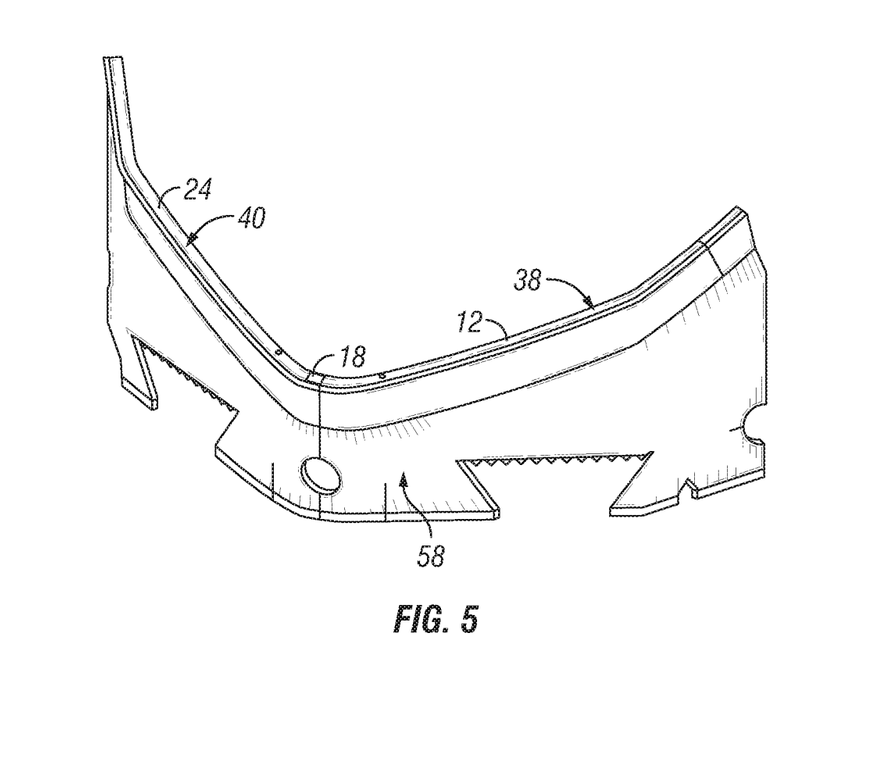
FIG. 5 is a perspective view of sipe elements engaged together.
Figure 6:
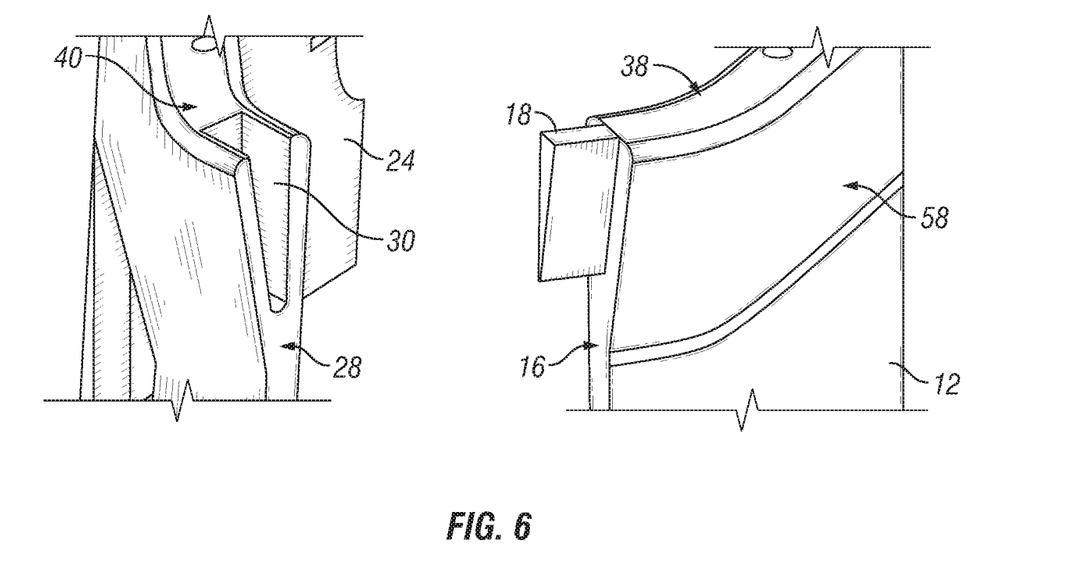
FIG. 6 is a perspective close up view of the ends of the sipe elements of FIG. 5 disengaged from one another.
Figure 7:
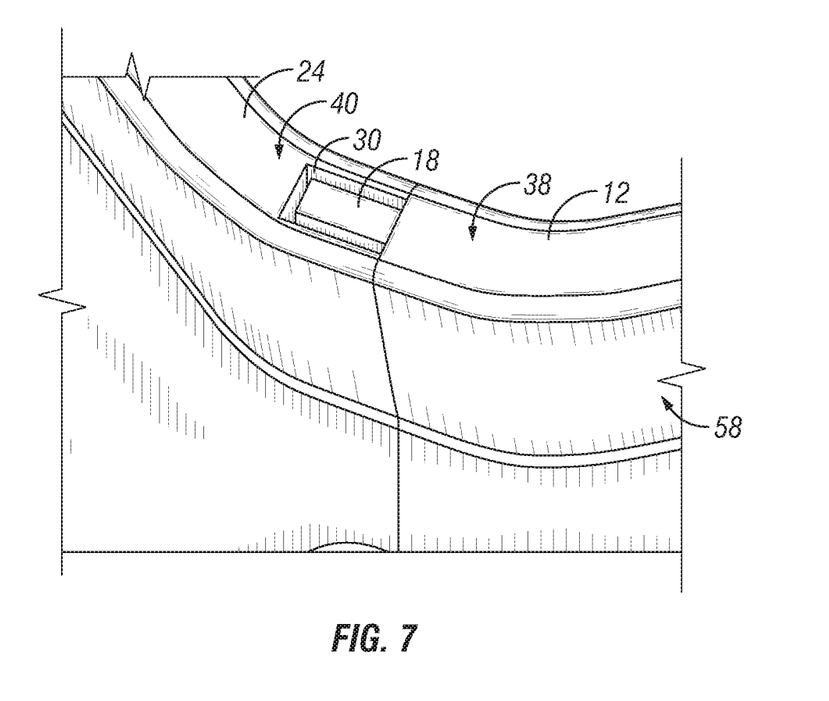
FIG. 7 is a perspective close up view of the ends of the sipe elements of FIG. 5 engaged with one another.

FIGS. 5-7 illustrate a first sipe element 12 and a second sipe element 24 in accordance with one exemplary embodiment. The sipe elements 12, 24 can be made out of a rigid material such as steel or aluminum, and each have a generally narrow thickness with a longer height, and an even longer length. The first and second sipes 12, 24 have an elongated and curved geometry in which straight sections of the sipes 12, 24 are intermittent curved sections. These two pieces 12, 24 are put together in order to form a resulting shape that can be used to mold a V-shaped sipe 44 into the tread 42. The first and second sipe elements 12, 24 are each pieces that have a shape that is not too curved overall so that each of them can be made via additive manufacturing methods, but their resultant combined shape of a V cannot be made via the same additive manufacturing methods in a single piece at one time. The two sipe elements 12, 24 are shown together and connected in FIG. 5, and have top surfaces 38, 40 that are oppositely disposed from bottom surfaces that feature open cavities. The open cavities at the bottom create legs at the bottom that allow the first and second sipe elements 12, 24 to be better secured into the flexible mold segment base 36. The protrusion 18 and cavity 30 can be located at the first and second sipe elements 12, 24 in the height directions 14, 26 so that they are located as far as possible from the surface of the mold segment base 36 into which the sipe elements 12, 24 are inserted.

The first and second sipe elements 12, 24 are disconnected in FIG. 6 which shows only a portion of their ends. The first sipe element 12 has a protrusion 18 that extends from a first sipe element side surface 16. The protrusion 18 has an upper surface that is coplanar and contiguous with a portion of the first sipe element top surface 38. The second sipe element 24 has a cavity 30 with a shape complimentary to the shape of the protrusion 18 so that the protrusion 18 can be received within the cavity 30. The cavity 30 is open at the second sipe element top surface 40, and the cavity 30 extends from the second sipe element side surface 28.

Although the cavity 30 has a shape that is complimentary to that of the protrusion 18, it need not be exactly the same shape as the protrusion 18, and need not afford an interference fit with the protrusion 18 when the protrusion 18 is inserted. The two disconnected sipe elements 12, 24 could be assembled onto one another before the elements 12, 24 are placed into the mold segment base 36, or one of the elements 12 or 24 could be put into the mold segment base 36 and then subsequently the other element 12 or 24 could be connected to the first at the same time it is placed into the mold segment base 36. FIG. 7 shows the ends of the first and second sipe elements 12, 24 of FIG. 6 but assembled onto one another. For assembly, the protrusion 18 is placed into the cavity 30 which retains the sipe elements 12, 24 to one another and keeps them from separating when in the somewhat flexible mold segment base 36, as may be the case if the protrusion 18 and cavity 30 arrangement were not present. The protrusion 18 is fit into the cavity 30 so that the side surfaces 16, 28 engage one another, and so that the protrusion 18 is surrounded on all sides by the second sipe element 24 save for the upper surface of the protrusion 18 which is exposed. The upper surface of the protrusion 18 may be coplanar with the second sipe element top surface 40. Some spacing may be present between the upper surface of the protrusion 18 and the portions of the second sipe element top surface 40 that partially surround it, but in other embodiments the fit may be tighter so that upper surface of the protrusion 18 is contiguous with the second sipe element top surface 40. The fit of the protrusion 18 inside the cavity 30 prevents relative twisting and some relative movement between these two elements 12, 24, but the fit does not prevent the disengagement of the two elements 12, 24 if they are pulled apart in a particular direction from one another. The protrusion 18 and cavity 30 assembled state has sufficient play for easy assembly, yet is tight enough to hold in place to facilitate insertion into the flexible mold segment 10, and allows for a rigid set in the mold segment 10.

Figure 8:
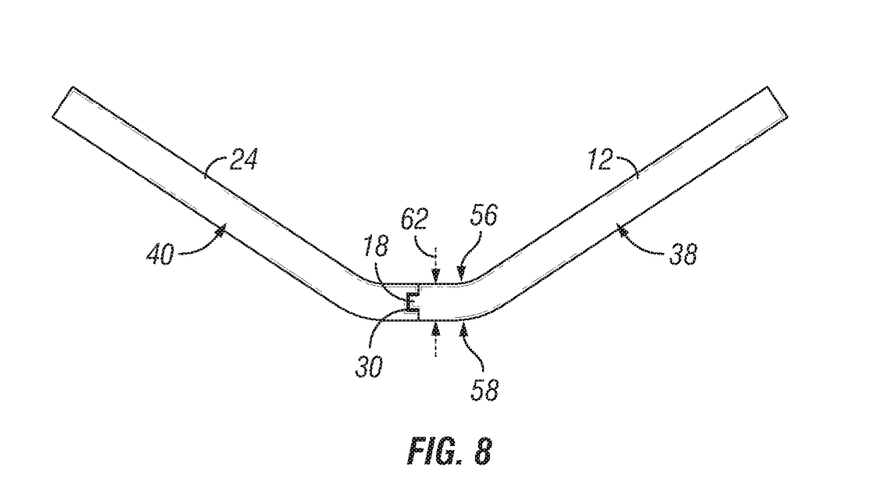
FIG. 8 is a top view of engaged sipe elements in accordance with another exemplary embodiment.
Figure 9:
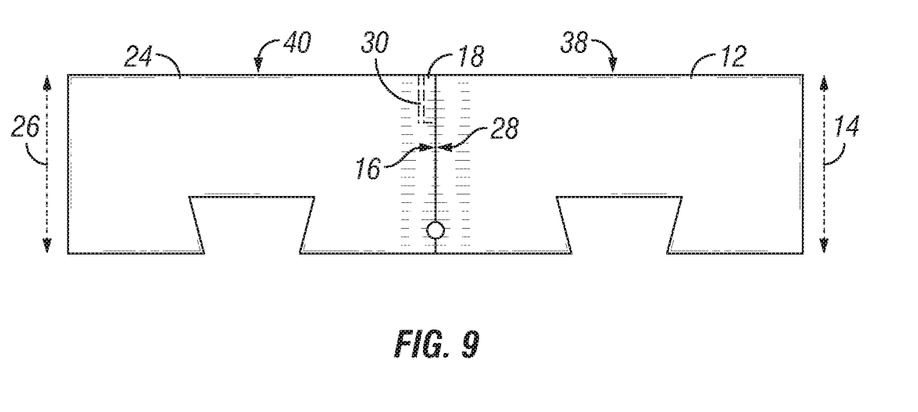
FIG. 9 is a front view of FIG. 8.

FIGS. 8-12 illustrate another embodiment of the first and second sipe elements 12, 24 that is similar to the one shown in FIGS. 5-7. With reference to FIG. 8, the first and second sipe elements 12, 24 are connected with one another via the protrusion 18 inserted into the cavity 30. During engagement, the sipe elements 12, 24 can be arranged so that the entire protrusion 18 is located inside of the cavity 30 and this is the only portion of the first sipe element 12 that is inside of the second sipe element 24, and no other portion of the first sipe element 12 is located within the second sipe element 24. The protrusion 18 is visible at the top of the assembled elements 12, 24 and the top of the protrusion 18 may be coplanar with the first and second sipe element top surfaces 38, 40. The protrusion 18 and cavity 30 are located at an apex section of the V-shaped assembly that features a small straight section of the first sipe element 12, and a small straight section of the second sipe element 24. The two sipe elements 12, 24 each curve shortly after the two features 18, 30 and then extend in a straight direction. FIG. 9 shows the protrusion 18 and cavity 30 as being located much closer to the first and second sipe element top surfaces 38, 40 than to the bottom surfaces of the sipe element 12, 24 in the height directions 14, 26. The protrusion 18 and cavity 30 are closer to the surfaces 38, 40 than to the center of the sipe elements 12, 24 in the height directions 14, 26. The protrusion 18 and cavity 30 are located completely within the straight sections of the elements 12, 24 before their curvature and extension to a longer straight section over the rest of the length of the elements 12, 24. In some embodiments, a small amount of the protrusion 18 can be located outside of the cavity 30, especially when the cavity 30 is open on the top. The mold segment 10 can be arranged so that the majority of the height of the protrusion 18 in the height direction 14 is located inside of the cavity 30, and a minority or none of the height of the protrusion 18 is located outside of the cavity 30.

Figure 10:
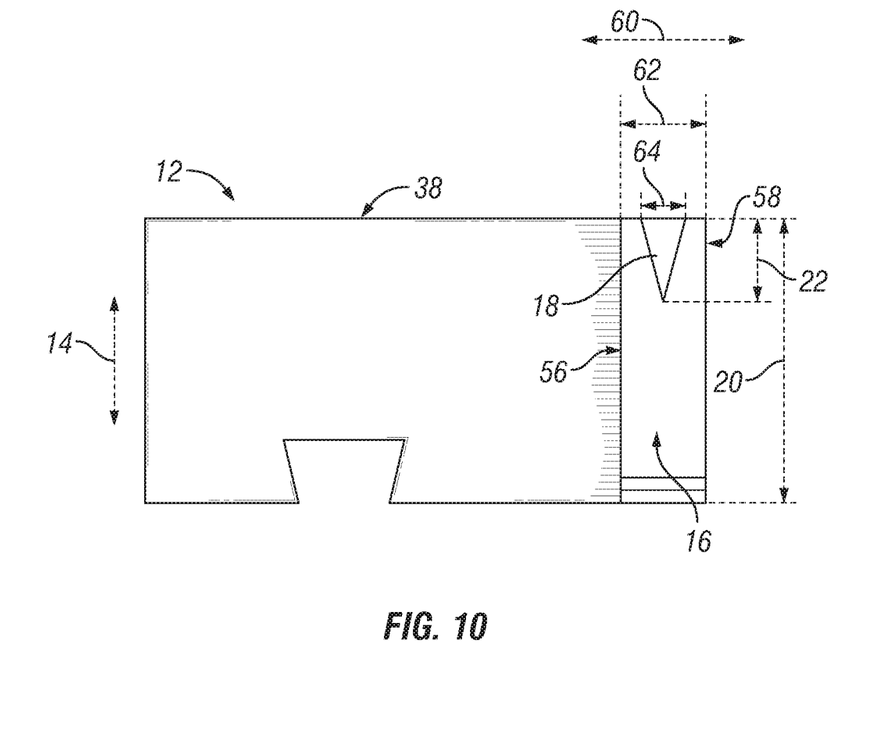
FIG. 10 is front view looking at the first sipe element side surface of the first sipe element of FIG. 8.

FIG. 10 is a front view of the first sipe element 12 looking at the plane of the first sipe element side surface 16 head on. The first sipe element 12 has a height 20 that extends in a height direction 14 of the first sipe element 12. The first sipe element side surface 16 is planar and in the shape of a rectangle and the protrusion 18 extends therefrom and has a triangular shape. The protrusion 18 has a height 22 that extends in the height direction 14. The height 22 is shorter than the height 20. The protrusion 18 extends down from the first sipe element top surface 38 to the bottom of height 22 such that all portions of the protrusion 18 are closer to the first sipe element top surface 38 in the height direction 14 than to the bottom of the first sipe element 12. The first sipe element 12 has a first face 56 and an oppositely disposed second face 58. The faces 56, 58 extend across the entire length of the first sipe element 12, and are bound in the height direction by the first sipe element top surface 38 and by the bottom surface of the first sipe element 12. The faces 56, 58 end at the first sipe element side surface 16, and have a thickness direction 60 that extends through these faces 56, 58 proximate to and at the first sipe element side surface 16.

The first sipe element 12 has a thickness 62 that is the distance from the first face 56 to the second face 58 in the thickness direction 60. The protrusion 18 likewise has a thickness 64 and this thickness 64 extends in the thickness direction 60. The thickness of the protrusion 18 is different at different locations of the protrusion 18 in the height direction 14. In some embodiments, the thickness 64 that is measured is the maximum thickness of the protrusion 18 and in the illustrated embodiment in FIG. 10 would be located at the first sipe element top surface 38. The thickness 64 is shorter than the thickness 62, and the protrusion 18 is spaced from both the first face 56 and the second face 58 in the thickness direction 60 and does not engage either one of these faces 56 or 58. The thickness 62, and likewise the thickness of the second sipe element 24, may be 1.4 millimeters or greater along the entire heights 20, 32, in accordance with certain exemplary embodiments. In one embodiment, the thickness 64 is 0.5 millimeters as measured as the greatest thickness 64 of the protrusion 18, and the thickness 62 is 1.4 millimeters.

Figure 11:
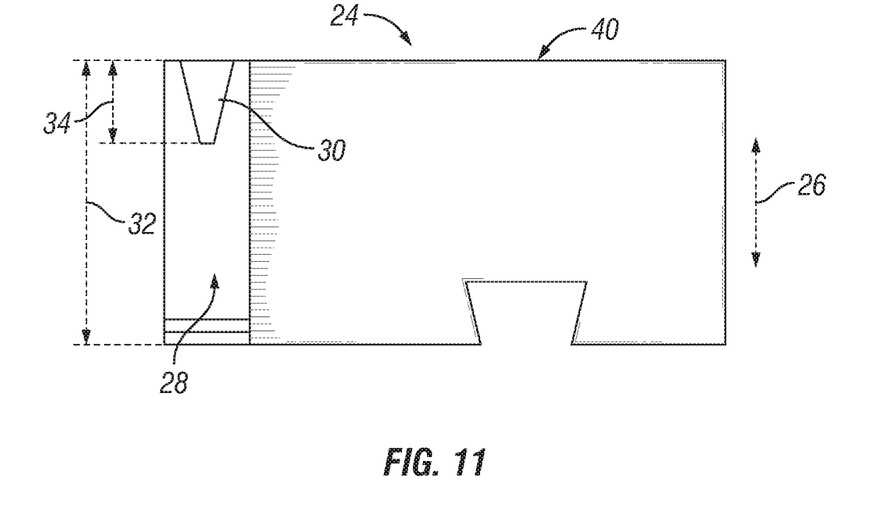
FIG. 11 is front view looking at the second sipe element side surface of the second sipe element of FIG. 8.
Figure 12:
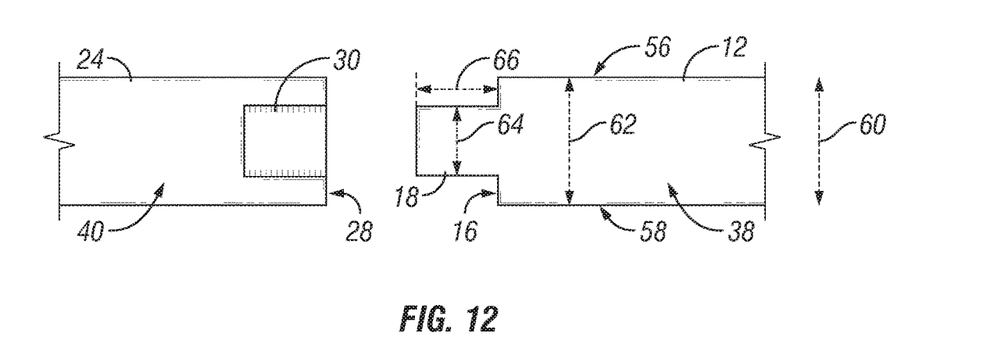
FIG. 12 is a close up top view of the sipe elements of FIG. 8 disengaged.

A top view of the end of the first sipe element 12 is illustrated in FIG. 12 which shows the protrusion 18 spaced from both of the faces 56, 58 in the thickness direction 60. The protrusion 18 is equal distant from the faces 56, 58 in the thickness direction 60 so as to be centered on the first sipe element side surface 16 in the thickness direction 60. The protrusion 18 extends a length 66 from the first sipe element side surface 16. The length 66 is longer than the thickness 64, but need not be in accordance with other exemplary embodiments. The length 66 is the same at all locations of the protrusion 18 in the thickness direction 60. The length 66 is 1.2 millimeters in accordance with one exemplary embodiment.

of the specification: FIG. 11 shows a front view, facing the plane of the second sipe element side surface 28, of the second sipe element 24. The second sipe element 24 has a height direction 26 and a height 32 that extends in the height direction 26 from the bottom surface of the second sipe element 24 to the second sipe element top surface 40. The cavity 30 has a height 34 that extends in the height direction 26 from the second sipe element top surface 40 to the bottom of the cavity 30. The height 34 is less than the height 32, and the cavity 30 is closer to the second sipe element top surface 40 than to the bottom surface of the second sipe element 24 in the height direction 26. The cavity 30 is spaced from opposite faces of the second sipe element 24 and is open at the second sipe element top surface 40 and at the second sipe element side surface 28. The cavity 30 has a V shape but does not terminate at a point but instead has a flat bottom. The width of the cavity 30 changes at different locations in the height direction 26 from the top to the bottom of the cavity 30. The cavity 30 may be larger than the protrusion 18 in that the width of the cavity 30 is greater than the thickness 64 to allow the protrusion 18 to be inserted into the cavity 30. The fit can have some play in it, but still tight enough to allow the protrusion 18 to be retained within the cavity 30. In one embodiment, the width of the cavity 30 at its widest part (in this case at the second sipe element top surface 40) is 0.8 millimeters, and the width of the second sipe element side surface 28 and the second sipe element 24 is 1.4 millimeters. An area of the second sipe element side surface 28 is less than an area of a second sipe element front face and is less than an area of a second sipe element back face.

of the specification: With reference to FIG. 12, the depth of the cavity 30 can be the same as the length 66, or may be larger than the length 66. The cavity 30 can accept the entire length 66 so that the first sipe element side surface 16 engages the second sipe element side surface 28 when the first and second sipe elements 12, 24 are attached to one another. With respect to the relative sizes between features of the sipe elements 12, 24, in accordance with various exemplary embodiments the thickness 64 may be from ⅓ to ⅔ of the thickness 62. The thickness 62 may be the thickness of the first sipe element side surface 16 proximate to the protrusion 18, and/or may be the thickness from the first face 56 to the second face 58 at the widest position of the first sipe element 12. Additionally or alternatively, the length 66 may be from 80% to 120% of the thickness 62 which can be the thickness of the first sipe element side surface 16 proximate to the protrusion 18, and/or may be the thickness from the first face 56 to the second face 58 at the widest portion of the first sipe element 12. The first sipe element side surface 16 has an area that is smaller than that of an area of the first face 56 and is smaller than that of an area of the second face 58.

When engaged, the first sipe element side surface 16 directly faces the second sipe element side surface 28 such that no other features are between these surfaces 16, 28. The protrusion 18 and the cavity 30 are not discontinuous along the heights 20, 32. In this regard, both the protrusion 18 and cavity 30 are located at only one spot along the heights 20, 32 and not in a plurality of positions as would be the case if, for example, two protrusions 18 were present along the height 20 one near the top surface 38 and the other closer to the bottom of the first sipe element 12.

Figure 13:
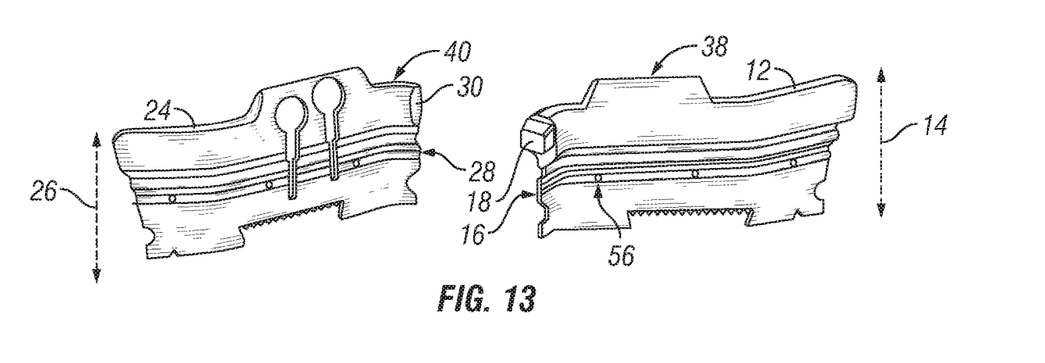
FIG. 13 is a perspective view of two sipe elements disengaged that have an overlapping arrangement in accordance with another embodiment.

Another exemplary embodiment of the first and second sipe elements 12, 24 is shown in FIG. 13 in which the first sipe element 12 is disengaged from the second sipe element 24. The first sipe element 12 has the protrusion 18 spaced from the first sipe element top surface 38 in the height direction 14. The second sipe element 24 has a cavity 30 that extends in from the second sipe element side surface 28, and the cavity 30 is spaced from the second sipe element top surface 40 in the height direction 26 and is not open at the top into the second sipe element top surface 40. The only opening of the cavity 30 is at the second sipe element side surface 28, and the only surface into which the cavity 30 extends is the second sipe element side surface 28. The cavity 30 is configured so that insertion of the protrusion 18 into the cavity 30 causes a portion of the second sipe element top surface 40 to overlap the protrusion 18. The overlapping arrangement of the protrusion 18 and cavity 30 can be used in designs that feature greater thicknesses of the first and second sipe elements 12, 24 than those previously illustrated in non-overlapping embodiments.

Figure 14:
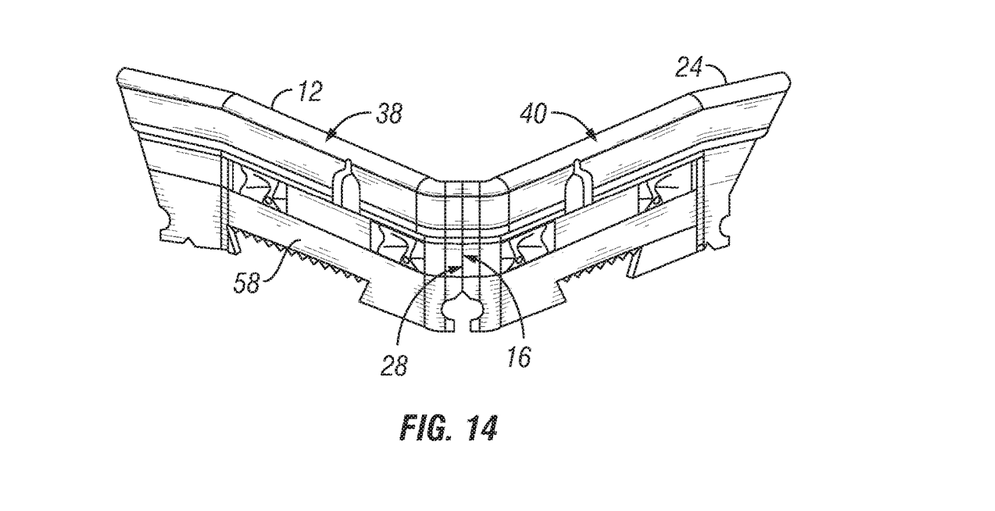
FIG. 14 is a perspective view of two sipe elements engaged with an overlapping arrangement in accordance with another embodiment.

FIG. 14 shows another exemplary embodiment of the first and second sipe elements 12, 24 in which the protrusion 18 is inserted into the cavity 30 and the sipe elements 12, 24 are engaged. The cavity 30 is offset from the second sipe element top surface 40 so a portion of this surface 40 covers the protrusion 18 when the protrusion 18 is inserted and an overlap arrangement is present. The protrusion 18 is likewise offset from the first sipe element top surface 38 in the height direction 14, and the protrusion 18 is not visible when the two sipe elements 12, 24 are engaged with one another and the protrusion 18 is located within the cavity 30. The first sipe element side surface 16 engages the second sipe element side surface 28 along the majority of the height 20 but not along the entire height 20. As shown, the bottom of the first sipe element side surface 16 does not engage the second sipe element side surface 28. This opening may facilitate placement and retention of the sipe elements 12, 24 into the mold segment base 36 during the assembly process.

Figure 15:
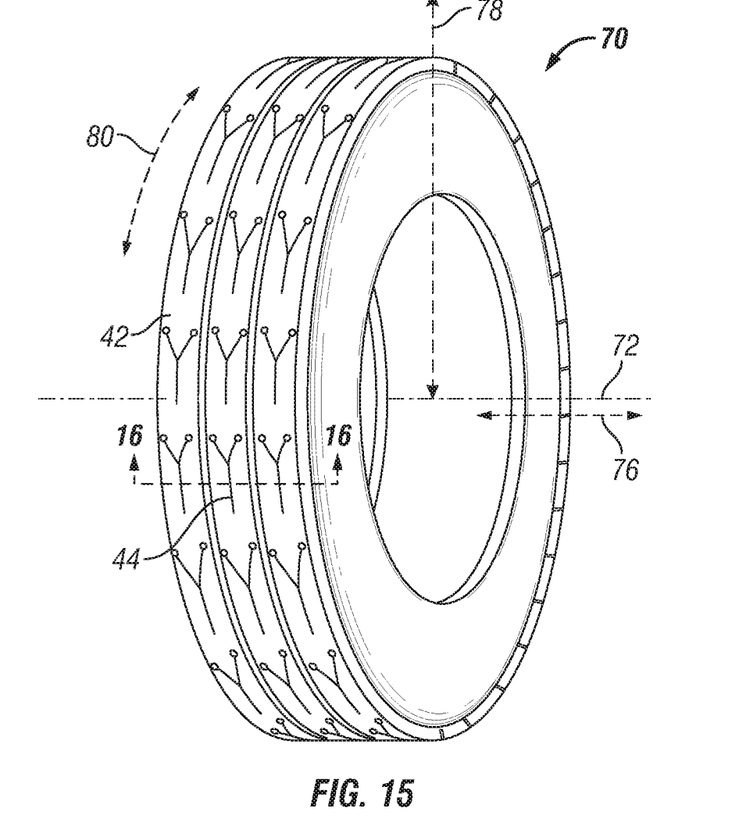
FIG. 15 is a perspective view of a tire with Y-shaped sipes.
Figure 16:
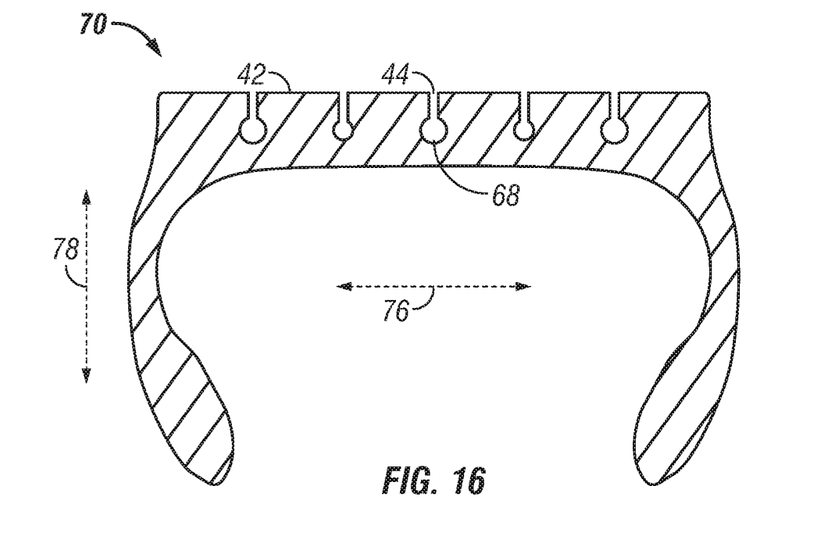
FIG. 16 is a cross-sectional view taken along line 16-16 of FIG. 15.
Figure 17:
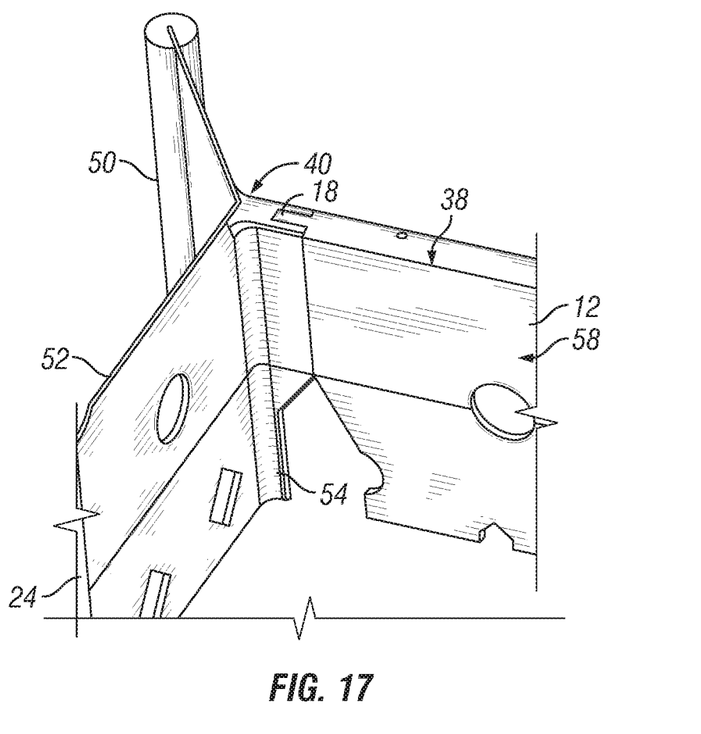
FIG. 17 is a perspective view of two engaged sipe elements configured for molding a Y-shaped sipe.

FIG. 15 is a perspective view of a tire 70 in accordance with another exemplary embodiment that includes Y-shaped sipes 44 distributed about the circumference of the tread 42. A cross-sectional view along line 16-16 of the tire 70 of FIG. 15 is shown in FIG. 16. The two longitudinal sipes are of teardrop shape. Further, the three Y-shaped sipes 44 each have a teardrop 68. A narrow section of the sipes 44 extends from the outer surface of the tread 42 in the radial direction 78 to the bottom of the sipe 44 where it opens up into the teardrop 68 which is wider than the narrow section. The Y-shaped sipes 44 are created by the first and second sipe elements 12, 24 and include wider sections to make the teardrops 68 and narrower sections to make the portions extending from the teardrops 68 to the outer surface of the tread 42. Although shown with teardrops 68, the sipes 44 need not include them in other embodiments. The sipes 44 may maintain the same cross-sectional profile along their entire depth, although this need not be the case in other embodiments. The teardrop longitudinal sipes 44 have a narrow section less than 2 millimeters extending from the surface of the tread 42 into the tread 42. The teardrop longitudinal sipes 44 then at the bottom of this narrow section open up into a larger void teardrop 68 that is wider, and in some cases may be greater than 2 millimeters, than the narrow section. The shape of the teardrop 68 can be round, rectangular, oval, or of any shape. When new, the teardrop 68 is hidden from view as it is within the interior of the tread 42. Wear of the tread 42 causes the rubber to be worn off until the larger void is exposed and imparts desired properties onto the performance of the tread 42 during use.

Figure 18:
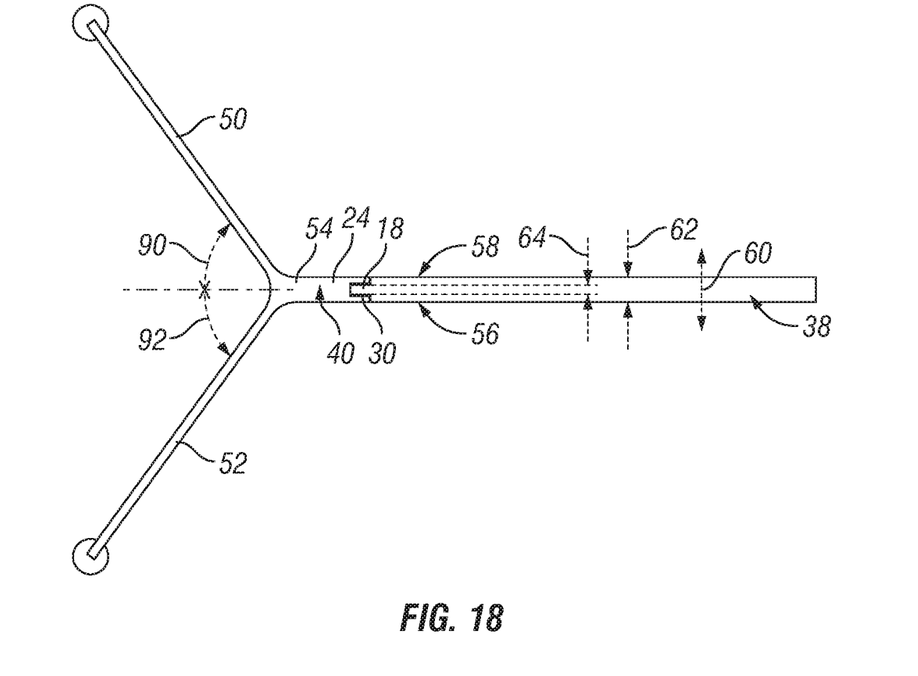
FIG. 18 is a top view of FIG. 17 with the two sipe elements engaged.

FIGS. 17-21 show an alternate exemplary embodiment of the sipe elements 12, 24 that can be used to create the Y-shaped sipe 44 of FIGS. 15 and 16. The first sipe element 12 is a generally flat piece that includes the protrusion 18 and can be made via an additive manufacturing process. The second sipe element 24 is made of three portions 54, 56, 58 that converge against one another. With reference to FIG. 18, the third portion 54 is aligned with the first sipe element 12 and has a centerline that is aligned with the centerline of the first sipe element 12. The first portion 50 is oriented at an angle 90 to the centerline of the third portion 54, and the second portion 52 is oriented at an angle 92 to the centerline of the third portion 54. The angles 90, 92 may be identical to one another. The first sipe element 12 may also be oriented at angles 90, 92 to the first and second portions 50, 52. The portions 54, 56, 58 may be small enough, and although the portions 54, 56, 58 are angled relative to one another the angles 90, 92 may be sized so that it is possible to build the second sipe element 24 via an additive manufacturing process. The protrusion 18 and cavity 30 engagement is again utilized in order to cause attachment of the sipe elements 12, 24 in the mold segment base 36. The angles 90, 92 can be 55 degrees in accordance with certain exemplary embodiments. In other arrangements, the angles 90, 92 can be from 45-65 degrees, from 50-65 degrees, from 30-50 degrees, from 25-70 degrees, or from 20-75 degrees.

Figure 19:
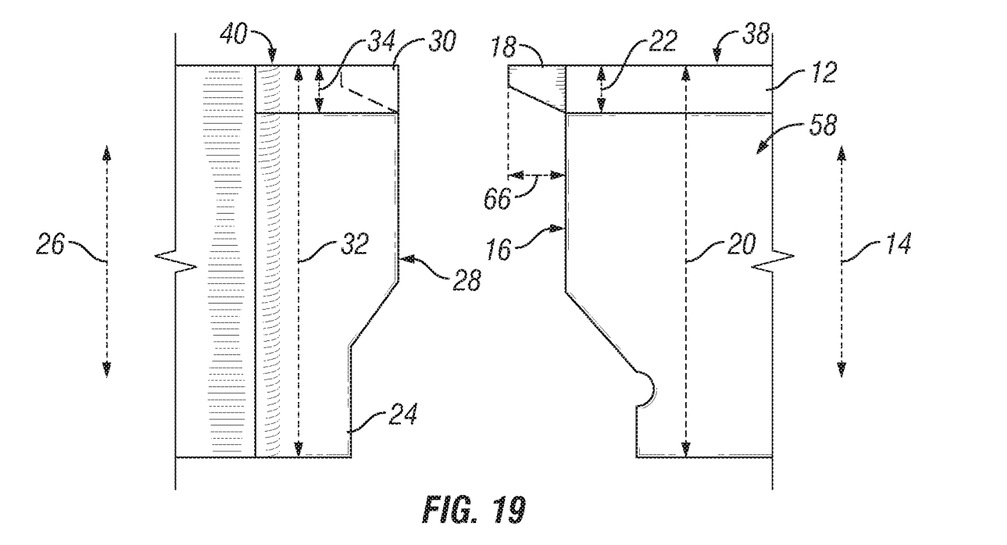
FIG. 19 is a close up side view of the sipe elements of FIG. 17 disengaged from one another.
Figure 20:
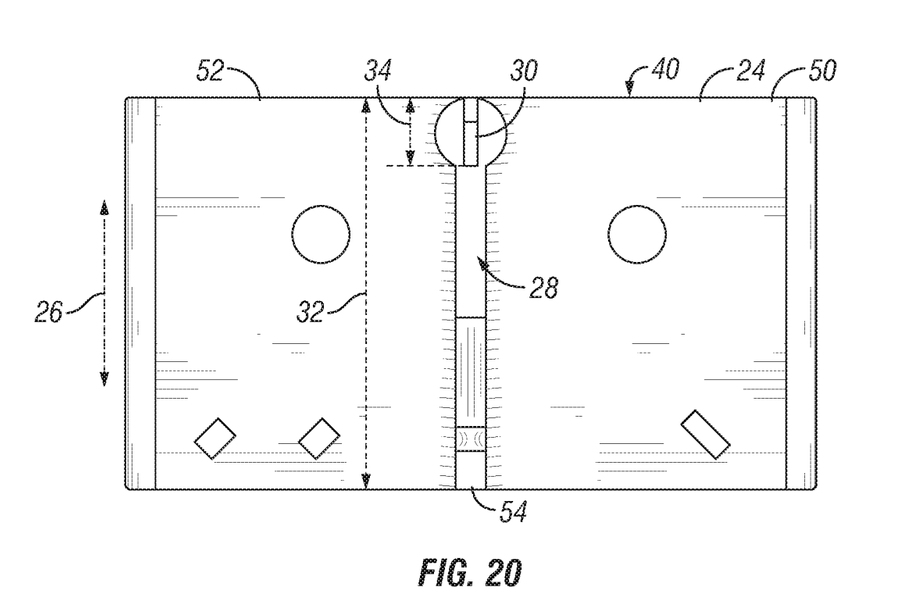
FIG. 20 is a front view looking at the second sipe element side surface of the second sipe element of FIG. 17.
Figure 21:
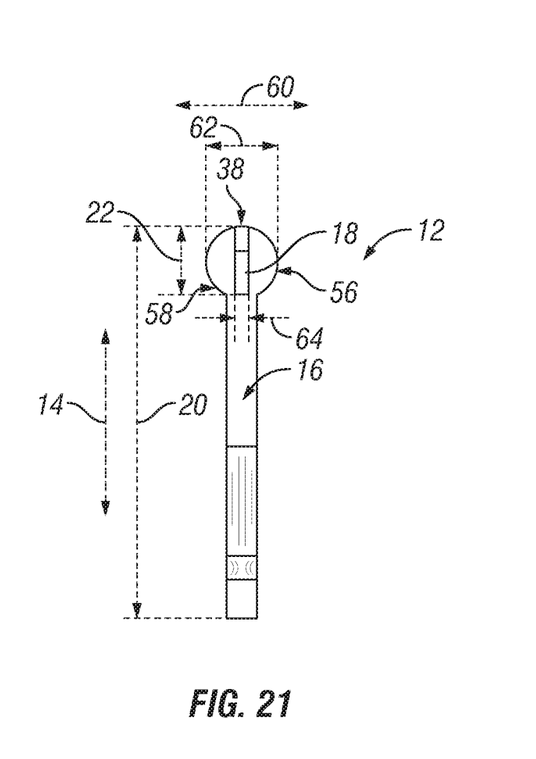
FIG. 21 is a front view looking at the first sipe element side surface of the first sipe element of FIG. 17.

FIGS. 19-21 show the sipe elements 12, 24 disengaged, and the protrusion 18 can be seen to be at the first sipe element top surface 38 and have a wedge shape. The protrusion 18 is wedge shaped with a generally rectangular face at the maximum length 66 and an inclined surface that extends from this face to the first sipe element side surface 16 with a decreasing length 66. The first sipe element 12 has a teardrop section that is circular that includes the first sipe element top surface 38, and the protrusion 18 is located in the teardrop section of the first sipe element 12 that forms the teardrop 68. The protrusion 18 does not extend to the portion of the first sipe element 12 that forms the narrow section that extends from the teardrop 68, but is instead completely located in the teardrop forming section. In a similar manner, the cavity 30 is located in the portion of the second side element 24 that forms the teardrop 68 of the resulting Y-shaped sipe 44, and is not located outside of this teardrop forming portion. The cavity 30 has a shape complimentary to that of the protrusion 18 and is larger than the protrusion 18 with an opening at the second sipe element top surface 40. Although shown in connection with Y-shaped first and second sipe elements 12, 24, the protrusion 18 and cavity 30 may be located only within the teardrop forming portions of these elements 12, 24 regardless of the resulting sipe 44 design. Still further, the protrusion 18 and cavity 30 could be completely outside of the teardrop section, or in both the teardrop section and outside of the teardrop section in other embodiments.

Figure 22:
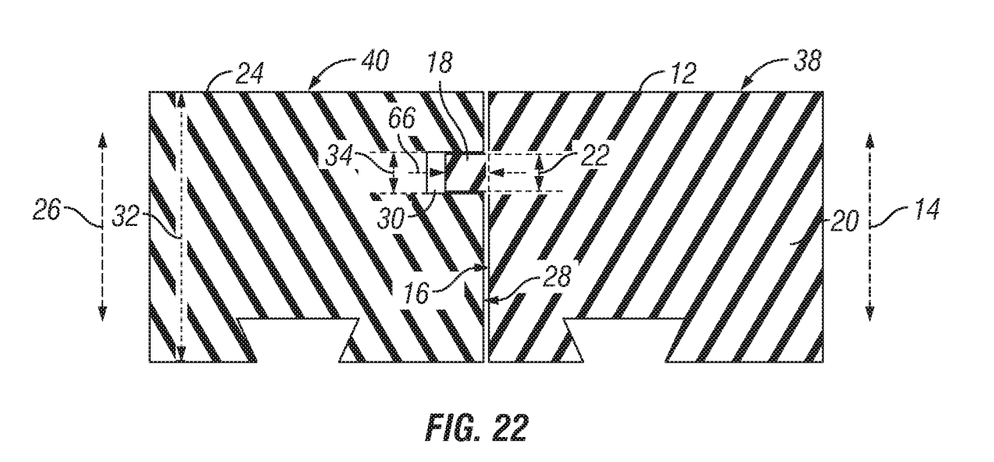
FIG. 22 is a cross-sectional side view of two engaged sipe elements in accordance with another exemplary embodiment.

FIG. 22 illustrates another exemplary embodiment in which the sipe elements 12, 24 are engaged with one another such that the first sipe element side surface 16 engages the second sipe element side surface 28 along their entire heights 20, 32 in the height directions 14, 26. As with previous versions, the surfaces 16, 28 could be arranged so that they engage during a part of their heights 20, 32 but not for all of their heights 20, 32. When determining what constitutes the surfaces 16, 28, it is to be understood that the cavity 30 and the protrusion 18 do not count at portions of the surfaces 16, 28. The protrusion 18 is located inside of the cavity 30 and may engage walls of the second sipe element 24 that define the cavity 30. However, the length 66 is not as long as the depth of the cavity 30 so that the protrusion 18 does not extend all the way to the back wall of the cavity 30 and is spaced a distance therefrom. In other arrangements, the protrusion 18 may in fact engage the back wall of the cavity 30 so that the two sipe elements 12, 24 engage one another at this area, and so that the first sipe element side surface 16 likewise engages completely the second sipe element side surface 28 along its entire height 20 in the height direction 14.

The protrusion 18 and cavity 30 can be variously shaped in accordance with other exemplary embodiments. The protrusion 18 could have a shape that is V-shaped, U-shaped, circular shaped, oval shaped, or rectangular shaped, and the cavity 30 may have the same shape as the protrusion 18 in these various embodiments. The protrusion 18 and cavity 30 could likewise have any other shape capable of causing connection between the first and second sipe elements 12, 24.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A mold segment for forming a tire, comprising:
   a first sipe element that has a first sipe element height direction, wherein the first sipe element has a first sipe element side surface that extends in the first sipe element height direction, wherein the first sipe element has a protrusion that extends from the first sipe element side surface, wherein the protrusion has a height that is less than a height of the first sipe element side surface, wherein the first sipe element has a first sipe element top surface;
   a second sipe element that has a second sipe element height direction, wherein the second sipe element has a second sipe element side surface that extends in the second sipe element height direction, wherein the second sipe element has a cavity that extends from the second sipe element side surface, wherein the cavity has a height that is less than a height of the second sipe element side surface, wherein the second sipe element has a second sipe element top surface, wherein an area of the second sipe element side surface is less than an area of a second sipe element front face and is less than an area of a second sipe element back face; and
   a mold segment base that receives the first sipe element and the second sipe element, wherein the cavity receives the protrusion such that the protrusion is located in the cavity, wherein the first sipe element side surface directly faces the second sipe element side surface;
   wherein the first sipe element has a first face and an oppositely disposed second face separated from one another so as to define a thickness in a thickness direction, wherein the protrusion has a protrusion thickness that extends in the thickness direction and that is less than the thickness, wherein the first sipe element side surface has an area that is smaller than that of an area of the first face and is smaller than that of an area of the second face.

2. The mold segment as set forth in claim 1, wherein the mold segment base is made of polysulfide castable mold rubber, and wherein the first sipe element and the second sipe element are forced into the polysulfide castable mold rubber to be received therein, and wherein no portion of the protrusion and wherein no portion of the cavity are located within the polysulfide castable mold rubber.

3. The mold segment as set forth in claim 1, wherein the second sipe element side surface extends from the second sipe element top surface, wherein the cavity is open at the second sipe element top surface such that the cavity extends from the second sipe element top surface, and
   wherein the protrusion extends from the first sipe element top surface.

4. The mold segment as set forth in claim 1, wherein the cavity is open only at the second sipe element side surface, and wherein the cavity is spaced from the second sipe element top surface in the height direction of the second sipe element and is not located at the second sipe element top surface; and
   wherein the protrusion is spaced from the first sipe element top surface in the height direction of the first sipe element.

5. The mold segment as set forth in claim 1, wherein the cavity is V-shaped, and wherein the protrusion is V-shaped.

6. The mold segment as set forth in claim 1, wherein the protrusion is the only portion of the first sipe element that is inside of the second sipe element, wherein the protrusion and the cavity are not discontinuous along the heights of the first sipe element side surface and the second sipe element side surface.

7. The mold segment as set forth in claim 1, wherein the protrusion is closer to the first sipe element top surface than to the mold segment base in the height direction of the first sipe element; and wherein the cavity is closer to the second sipe element top surface than to the mold segment base in the height direction of the second sipe element.

8. The mold segment as set forth in claim 1, wherein the thickness of the protrusion is from ⅓ to ⅔ the thickness defined by the first face and the second face proximate to the protrusion;
wherein the protrusion extends a maximum length from the first sipe element side surface an amount that is from 80% to 120% of the amount of the thickness defined by the first face and the second face proximate to the protrusion.

9. The mold segment as set forth in claim 1, wherein the protrusion is located completely in the cavity such that no portion of the protrusion is located outside of the cavity.

10. The mold segment as set forth in claim 1, wherein the first sipe element side surface engages the second sipe element side surface along a portion of but not all of the height of the first sipe element side surface and a portion of but not all of the height of the second sipe element side surface.

11. The mold segment as set forth in claim 1, wherein the protrusion extends a length from the first sipe element side surface, wherein the length of the protrusion is different at different locations of the protrusion along the first sipe element side surface.

12. The mold segment as set forth in claim 1, wherein the mold segment base is a portion of a production mold segment.

13. A mold segment for forming a tire, comprising:
a first sipe element that has a first sipe element height direction, wherein the first sipe element has a first sipe element side surface that extends in the first sipe element height direction, wherein the first sipe element has a protrusion that extends from the first sipe element side surface, wherein the protrusion has a height that is less than a height of the first sipe element side surface, wherein the first sipe element has a first sipe element top surface;
a second sipe element that has a second sipe element height direction, wherein the second sipe element has a second sipe element side surface that extends in the second sipe element height direction, wherein the second sipe element has a cavity that extends from the second sipe element side surface, wherein the cavity has a height that is less than a height of the second sipe element side surface, wherein the second sipe element has a second sipe element top surface;
a mold segment base that receives the first sipe element and the second sipe element, wherein the cavity receives the protrusion such that the protrusion is located in the cavity, wherein the first sipe element side surface directly faces the second sipe element side surface;
wherein the first sipe element and the second sipe element are configured for forming a V-shaped sipe of a tread, wherein the protrusion and the cavity are located at an area of the first sipe element and the second sipe element configured for forming an apex of the V-shaped sipe of the tread.

14. A mold segment for forming a tire, comprising:
a first sipe element that has a first sipe element height direction, wherein the first sipe element has a first sipe element side surface that extends in the first sipe element height direction, wherein the first sipe element has a protrusion that extends from the first sipe element side surface, wherein the protrusion has a height that is less than a height of the first sipe element side surface, wherein the first sipe element has a first sipe element top surface;
a second sipe element that has a second sipe element height direction, wherein the second sipe element has a second sipe element side surface that extends in the second sipe element height direction, wherein the second sipe element has a cavity that extends from the second sipe element side surface, wherein the cavity has a height that is less than a height of the second sipe element side surface, wherein the second sipe element has a second sipe element top surface;
a mold segment base that receives the first sipe element and the second sipe element, wherein the cavity receives the protrusion such that the protrusion is located in the cavity, wherein the first sipe element side surface directly faces the second sipe element side surface;
wherein the first sipe element and the second sipe element are configured for forming a Y-shaped sipe of a tread, wherein the second sipe element has a first portion and a second portion that are oriented at an angle to one another, wherein the second sipe element has a third portion and wherein the second sipe element side surface is located at the third portion;
wherein the first sipe element and the third portion are oriented at the same angle to the first portion, and wherein the first sipe element and the third portion are oriented at the same angle to the second portion.

15. A mold segment for forming a tire, comprising:
a first sipe element that has a first sipe element height direction, wherein the first sipe element has a first sipe element side surface that extends in the first sipe element height direction, wherein the first sipe element has a protrusion that extends from the first sipe element side surface, wherein the protrusion has a height that is less than a height of the first sipe element side surface, wherein the first sipe element has a first sipe element top surface;
a second sipe element that has a second sipe element height direction, wherein the second sipe element has a second sipe element side surface that extends in the second sipe element height direction, wherein the second sipe element has a cavity that extends from the second sipe element side surface, wherein the cavity has a height that is less than a height of the second sipe element side surface, wherein the second sipe element has a second sipe element top surface;
a mold segment base that receives the first sipe element and the second sipe element, wherein the cavity receives the protrusion such that the protrusion is located in the cavity, wherein the first sipe element side surface directly faces the second sipe element side surface;
wherein a majority of a the height of the protrusion is located in the cavity such that only a minority of the height of the protrusion is located outside of the cavity.

* * * * *